US011117489B2

(12) United States Patent
Soeda et al.

(10) Patent No.: US 11,117,489 B2
(45) Date of Patent: Sep. 14, 2021

(54) CONTROL METHOD, SERVER, IN-VEHICLE DEVICE, AND RECORDING MEDIUM

(71) Applicant: Panasonic Intellectual Property Corporation of America, Torrance, CA (US)

(72) Inventors: Junichiro Soeda, Nara (JP); Kohsuke Yoshioka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 225 days.

(21) Appl. No.: 16/391,820

(22) Filed: Apr. 23, 2019

(65) Prior Publication Data
US 2019/0329669 A1 Oct. 31, 2019

Related U.S. Application Data

(60) Provisional application No. 62/663,407, filed on Apr. 27, 2018.

(30) Foreign Application Priority Data

Mar. 5, 2019 (JP) ............. JP2019-039734

(51) Int. Cl.
*B60L 58/16* (2019.01)
*G06N 20/00* (2019.01)
(Continued)

(52) U.S. Cl.
CPC ............. *B60L 58/16* (2019.02); *B60L 50/60* (2019.02); *B60L 58/12* (2019.02); *G06N 20/00* (2019.01);
(Continued)

(58) Field of Classification Search
CPC .......... B60L 58/16; B60L 50/60; B60L 58/12; B60L 2240/545; G06N 20/00;
(Continued)

(56) References Cited

U.S. PATENT DOCUMENTS

| 5,606,243 A | 2/1997 | Sakai et al. | |
|---|---|---|---|
| 6,049,193 A * | 4/2000 | Chien ................. | H02J 7/00712 320/132 |

(Continued)

FOREIGN PATENT DOCUMENTS

EP  2 827 164  1/2015

OTHER PUBLICATIONS

Kaula, Inc., "Kaula won a prize for 'Blockchain-based full lifecycle management system for batteries' at the international competition at Wanxiang Global Blockchain Summit held in Shanghai, China", Oct. 16, 2017 (URL:https://prtimes.jp/main/html/rd/p/000000004.000024621.html), with partial English translation.

(Continued)

*Primary Examiner* — Russell Frejd
(74) *Attorney, Agent, or Firm* — Wenderoth, Lind & Ponack, L.L.P.

(57) ABSTRACT

Provided is a control method which includes: obtaining battery information which is information regarding a battery; calculating a present residual value of the battery based on the battery information obtained; calculating a first residual value using a first model which has been trained, the first residual value being a residual value of the battery in a case where a user uses the battery with a tendency identical to a tendency of a plurality of other users; and issuing a token to the user according to an evaluation value calculated based on the present residual value and the first residual value calculated.

16 Claims, 13 Drawing Sheets

(51) Int. Cl.
  *B60L 50/60* (2019.01)
  *B60L 58/12* (2019.01)
  *G06Q 20/22* (2012.01)
  *G07C 5/08* (2006.01)

(52) U.S. Cl.
  CPC ........... *G06Q 20/29* (2013.01); *G07C 5/0825* (2013.01); *B60L 2240/545* (2013.01); *B60Y 2200/91* (2013.01)

(58) Field of Classification Search
  CPC .. G06Q 20/29; G07C 5/0825; B60Y 2200/91; Y02T 10/70; G01R 31/367
  See application file for complete search history.

(56) References Cited

U.S. PATENT DOCUMENTS

| | | | | |
|---|---|---|---|---|
| 2005/0233189 A1* | 10/2005 | Shioya | ............... | H01M 8/04776 429/513 |
| 2005/0268131 A1* | 12/2005 | Matsunobu | ............... | G06F 1/30 713/323 |
| 2009/0033276 A1* | 2/2009 | Ishii | ............... | H02J 7/0071 320/103 |
| 2011/0193522 A1* | 8/2011 | Uesugi | ............... | B60L 53/64 320/109 |
| 2013/0218405 A1* | 8/2013 | Ishiguma | ............... | G01R 31/382 701/34.4 |
| 2014/0361745 A1* | 12/2014 | Nishita | ............... | B60L 11/1844 320/109 |
| 2020/0110453 A1* | 4/2020 | Wells | ............... | G06F 1/28 |
| 2020/0231064 A1* | 7/2020 | Zhao | ............... | H01M 50/20 |

OTHER PUBLICATIONS

Extended European Search Report dated Sep. 27, 2019 in corresponding European Patent Application No. 19168336.6.

* cited by examiner

| IMPROVEMENT RATIO | 50% | 25% | 10% | 0 | -10% | -25% | -50% |
|---|---|---|---|---|---|---|---|
| POINTS | 5 | 2 | 1 | 0 | -1 | -2 | -5 |

CONTROL METHOD, SERVER, IN-VEHICLE DEVICE, AND RECORDING MEDIUM

CROSS REFERENCE TO RELATED APPLICATION

This application claims the benefit of priority of U.S. Provisional Patent Application No. 62/663,407 filed on Apr. 27, 2018 and Japanese Patent Application Number 2019-039734 filed on Mar. 5, 2019, the entire contents of which are hereby incorporated by reference.

BACKGROUND

1. Technical Field

The present disclosure relates to a control method, a server, an in-vehicle device, and a recording medium.

2. Description of the Related Art

A battery management system (BMS) is known which detects the state of charge of a secondary battery (a rechargeable battery) at high precision and performs optimal charge/discharge control and safety control. For example, Non-Patent Literature 1 (NPL 1) proposes a system for evaluating the battery residual value of an electric automobile using blockchain (NPL 1: Kaula Inc., "Kaula won a prize for Blockchain-based full life-cycle management system for batteries' at the international competition at Wanxiang Global Blockchain Summit held in Shanghai, China" (Chugoku Shanghai-shi de kaisai sareta Wanxiang Global Blockchain Summit kokusai kontesuto de "Blockchain wo mochiita EV batteri furu raifu saikuru kanri" bumon de nyuusho), retrieved from https://prtimes.jp/main/html/rd/p/000000004.000024621.html).

According to NPL 1, use of blockchain, that is, use of distributed ledger management technology, enables ensuring of the authenticity and anti-tampering of the battery residual value.

SUMMARY

The technique disclosed by NPL 1, however, merely ensures the authenticity and anti-tampering of the battery residual value. In other words, with the technique disclosed by NPL 1, while it is possible to ensure the authenticity and anti-tampering of the battery residual value obtained as a result of an action taken for using the battery residual value with maximum efficiency, the user has no motivation to take that action. Consequently, the technique disclosed by NPL 1 also causes a case where the user does not use the battery in a manner that suppresses a decrease in the battery residual value.

The present disclosure has been conceived in view of the above circumstances and has an object to provide a control method and related technologies that make it possible for a battery to be used in a manner that further suppresses a decrease in the battery residual value.

In order to solve the problem described above, a control method according to an aspect of the present disclosure is a control method including: obtaining battery information which is information regarding a battery; calculating a present residual value of the battery based on the battery information obtained; calculating a first residual value using a first model which has been trained, the first residual value being a residual value of the battery in a case where a user uses the battery with a tendency identical to a tendency of a plurality of other users; and issuing a token to the user according to an evaluation value calculated based on the present residual value and the first residual value calculated.

Note that the above general or specific aspects may be realized by a system, a method, an integrated circuit, a computer program, or a computer-readable recording medium such as a compact disc read only memory (CD-ROM), or by any combination of systems, methods, integrated circuits, computer programs, or recording media.

A control method and related technologies according to the present disclosure make it possible for a battery to be used in a manner that further suppresses a decrease in the battery residual value.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF EMBODIMENT

Figure 1:
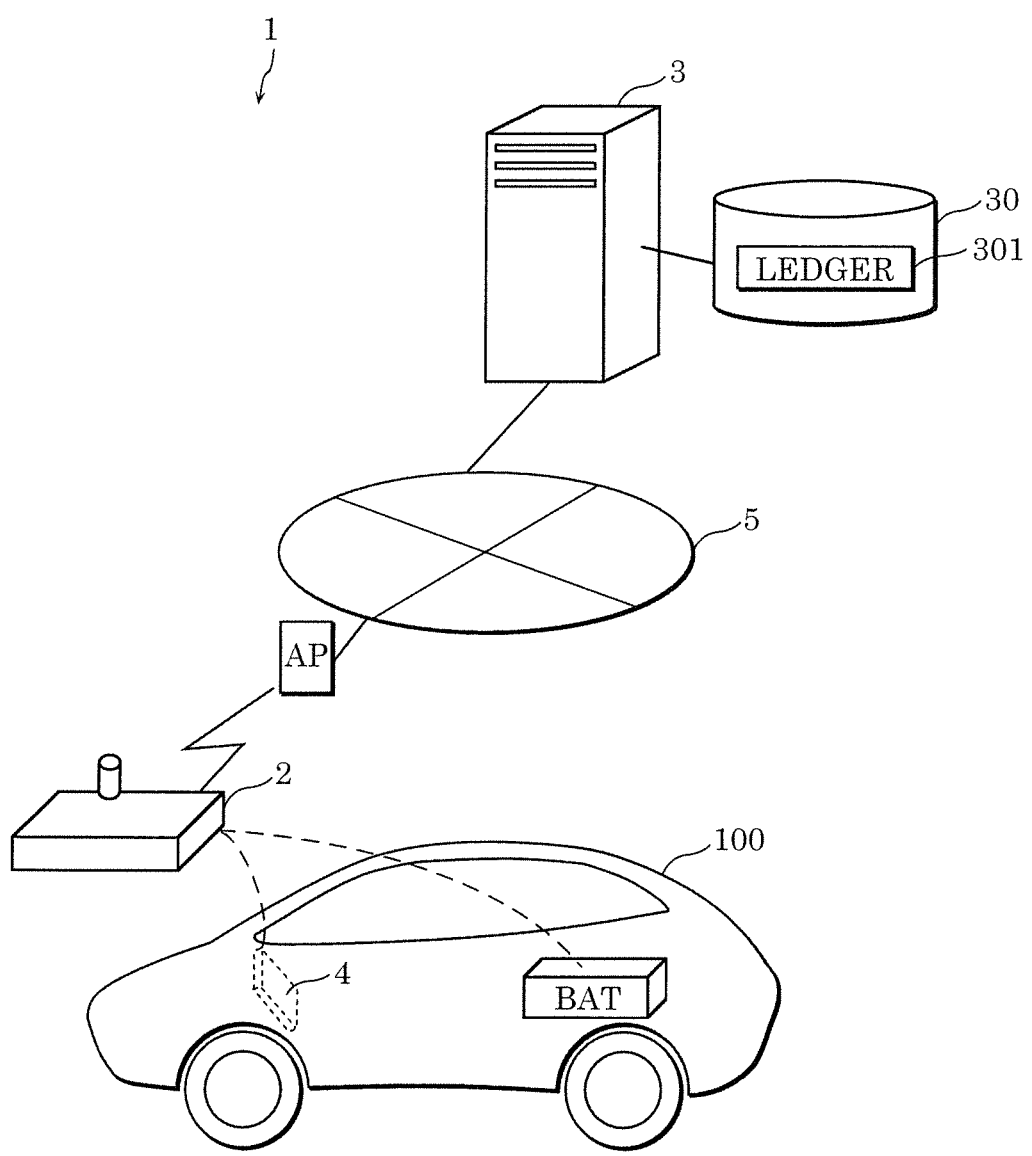
FIG. 1 illustrates an example of a configuration of a system according to an embodiment.

A control method according to an aspect of the present disclosure includes: (a) obtaining battery information which is information regarding a battery; (b) calculating a present residual value of the battery based on the battery information obtained; (c) calculating a first residual value using a first model which has been trained, the first residual value being a residual value of the battery in a case where a user uses the battery with a tendency identical to a tendency of a plurality of other users; and (d) issuing a token to the user according to an evaluation value calculated based on the present residual value and the first residual value calculated.

With this, a token is issued when the calculated evaluation value is positive, e.g., when the present residual value resulted from the usage of the battery by the user is higher than the first residual value that is a residual value in the case where the battery is used as normal. That is to say, it is possible to cause the user to use the battery in a manner that further suppresses a decrease in the battery residual value. In addition, since this allows the battery to have an extended lifetime, the battery is efficiently used, e.g., used in recycling, thus leading to energy conservation.

Here, for example, the first model is obtained by teaching the first model how degradation of the battery progresses based on a battery usage tendency of the plurality of other users, and is used for calculating the first residual value.

With this, since the first residual value can be calculated using the first model which has been trained by machine learning or the like, the first residual value can be calculated precisely.

For example, the present residual value and the first residual value may be recorded on a blockchain.

This makes it possible to ensure the authenticity and anti-tampering of the first residual value and the present residual value. As a result, a token can be issued with reduction in erroneous calculation of the evaluation value. Even if a problem occurs in the token issuance, the correct cause of the problem can be identified.

Here, for example, the token is issued using micropayment technology.

Since this makes micropayments possible, a token can be effectively issued to the user who uses the battery in a manner that further suppresses a decrease in the battery residual value.

For example, the evaluation value may be a difference between the present residual value and the first residual value.

For example, the evaluation value may be calculated by multiplying a value of a ratio of the present residual value with respect to the first residual value by a usage time period which is a time period from when the user starts using the battery to when the user finishes using the battery, the present residual value being a residual value reduced as a result of a lapse of the usage time period.

Here, for example, the evaluation value may be calculated by multiplying a value of a point corresponding to a ratio by the usage time period, the ratio being a proportion of a first difference between the first residual value and the present residual value that is calculated in (b) and is a residual value at a time when the user finishes using the battery to a second difference between the first residual value and the residual value that is calculated in (b) and is a residual value at a time when the user starts using the battery, given that the second difference is 100%.

For example, the control method may further include: (e) calculating a second residual value using a second model which has been trained, the second residual value being a residual value of the battery in a case where the battery is used in an optimal manner to minimize degradation of the battery; and (f) calculating a difference between the second residual value and the present residual value, and, based on the difference, providing the user of the battery with an assistance display which encourages an action related to usage of the battery.

With this, since it is possible to provide an assistance display to encourage use of the battery in a manner that extends the battery lifetime, it is possible to cause the user to use the battery in a manner that further suppresses a decrease in the battery residual value. In addition, since this allows the battery to have an extended lifetime, the battery is efficiently used in, for example, recycling, thus leading to energy conservation.

Here, for example, the second model is obtained by teaching the second model a relationship between a state of the battery and a state of degradation that is indicated by a state of health (SOH) when the battery is used or charged, and the second model is used for calculating the second residual value, the state of the battery including a remaining capacity and a temperature.

For example, in (f): a remaining capacity of the battery at which the battery should be charged to minimize the degradation of the battery may be derived based on a state of degradation of the battery acquired from the battery information obtained; and as the assistance display which encourages the action, an assistance display which indicates a timing at which the battery should be charged may be provided based on a present remaining capacity of the battery acquired from the battery information obtained and actual usage of the battery by the user, the timing at which the battery should be charged corresponding to a timing at which the remaining capacity of the battery reaches the remaining capacity derived.

For example, in (f): an amount of current to be generated by the battery to minimize the degradation of the battery may be derived based on a state of degradation of the battery acquired from the battery information obtained; and as the assistance display which encourages the action, a display indicating a difference between the amount of current derived and a present amount of current of the battery acquired from the battery information obtained may be provided based on the present amount of current of the battery and actual usage of the battery by the user.

For example, in (f): a temperature environment in which the battery should be charged to minimize the degradation of the battery may be derived based on a state of degradation of the battery acquired from the battery information obtained; and as the assistance display which encourages the action, a display indicating, on a map, a spot at which the battery is chargeable in the temperature environment derived may be provided.

For example, (d) may further include issuing an additional token other than the token to the user when the present residual value calculated exceeds the second residual value.

A control method according to an aspect of the present disclosure includes: obtaining battery information which is information regarding a battery; calculating a present residual value of the battery based on the battery information obtained; calculating, using a model which has been trained, a residual value of the battery in a case where the battery is used in an optimal manner to minimize degradation of the battery; and calculating a difference between the residual value and the present residual value, and, based on the difference, providing a user of the battery with an assistance display which encourages an action related to usage of the battery.

A server according to an aspect of the present disclosure includes: an evaluation unit configured to calculate an evaluation value based on a present residual value of a battery calculated based on battery information regarding the battery and a first residual value calculated using a first model which has been trained, the first residual value being a residual value of the battery in a case where a user uses the battery with a tendency identical to a tendency of a plurality of other users; and a token issuance unit configured to issue a token to the user according to the evaluation value calculated by the evaluation unit.

An in-vehicle device according to an aspect of the present disclosure includes: an obtaining unit configured to obtain battery information which is information regarding a battery; a present residual value calculator which calculates a present residual value of the battery based on the battery information obtained by the obtaining unit; and a first residual value calculator which calculates a first residual value using a first model which has been trained, the first residual value being a residual value of the battery in a case where a user uses the battery with a tendency identical to a tendency of a plurality of other users. A token is issued to the user according to an evaluation value calculated based on the present residual value and the first residual value calculated.

A recording medium according to an aspect of the present disclosure is a non-transitory computer-readable recording medium for use in a computer, the recording medium having a computer program recorded thereon for causing the computer to execute: (a) obtaining battery information which is information regarding a battery; (b) calculating a present residual value of the battery based on the battery information obtained; (c) calculating a first residual value using a first model which has been trained, the first residual value being a residual value of the battery in a case where a user uses the battery with a tendency identical to a tendency of a plurality of other users; and (d) issuing a token to the user according to an evaluation value calculated based on the present residual value and the first residual value calculated.

The following embodiment shows a specific example of the present disclosure. The numerical values, shapes, structural elements, steps, the processing order of the steps etc. illustrated in the following embodiment are mere examples, and are not intended to limit the present disclosure. Moreover, among the structural elements in the following embodiment, structural elements not recited in any one of the independent claims representing the most generic concepts will be described as optional structural elements. The embodiments can be combined with one another.

Embodiment

Hereinafter, system 1 according to the present embodiment will be described with reference to the drawings.

[Configuration of System 1]

FIG. 1 illustrates an example of a configuration of system 1 according to the present embodiment.

As illustrated in FIG. 1, system 1 includes BMS control device 2, server 3 connected to storage device 30, and terminal 4 included in mobile body 100 that includes a battery. BMS control device 2 and server 3 are connected to each other via network 5. BMS control device 2 is also connected to the battery and terminal 4 of mobile body 100 wirelessly or via wired connection such as a connector. BMS control device 2 may be disposed inside mobile body 100.

System 1 leaves a record, using blockchain (BC), of the residual value calculated by BMS control device 2, and issues a token as a reward to a user who uses the battery in a manner that extends the battery lifetime. This way, it is possible to cause the user to use the battery in a manner that further suppresses a decrease in the battery residual value.

[Mobile Body 100]

Mobile body 100 is a vehicle or a drone which includes a battery and can be driven by the battery. Examples of the vehicle include an electric automobile (an electric vehicle (EV)), an electric motorcycle, and an electric train. The battery is, for example, a lithium-ion battery or a nickel-metal hydride battery, but any battery may be used so long as it is a high-capacity secondary battery.

[BMS Control Device 2]

Figure 2:
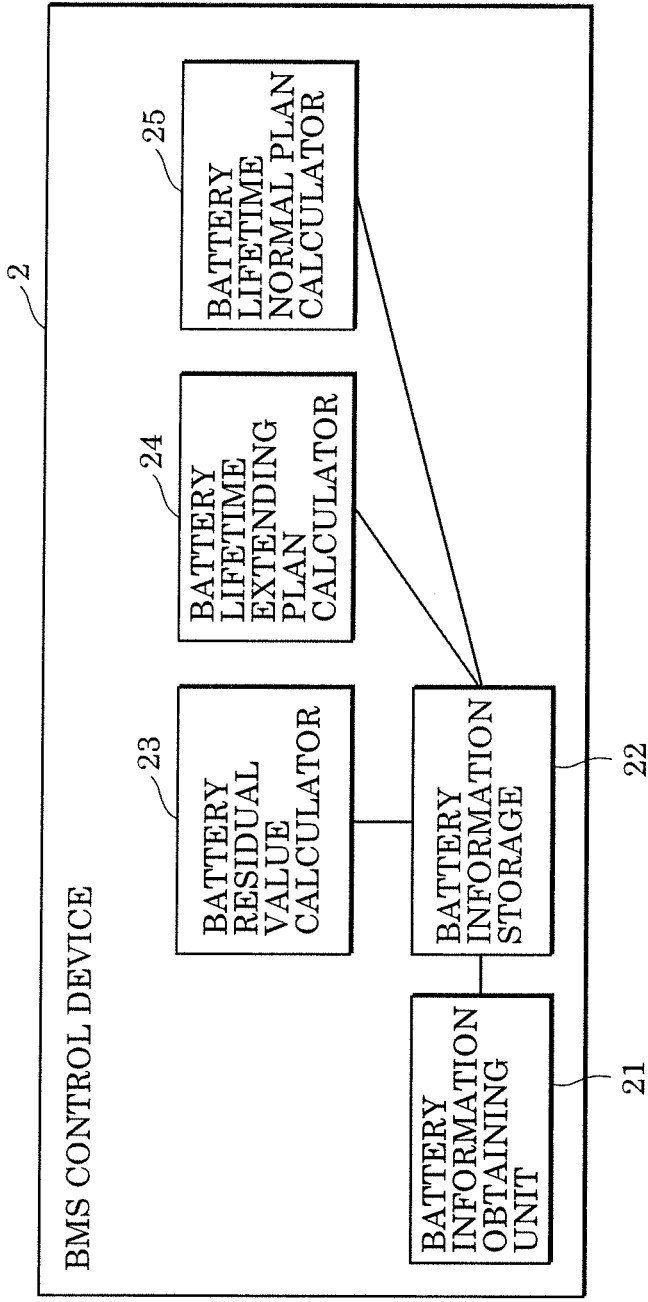
FIG. 2 is a block diagram illustrating an example of a detailed configuration of a BMS control device illustrated in FIG. 1.

FIG. 2 is a block diagram illustrating an example of a detailed configuration of BMS control device 2 illustrated in FIG. 1. BMS control device 2 is realized by, for example, a computer including a processor and a memory. As illustrated in FIG. 2, BMS control device 2 includes battery information obtaining unit 21, battery information storage 22, battery residual value calculator 23, battery lifetime extending plan calculator 24, and battery lifetime normal plan calculator 25. BMS control device 2 may be disposed inside mobile body 100 or may be disposed outside mobile body 100. For example, when mobile body 100 is a drone, BMS control device 2 may be disposed outside mobile body 100 and connected to the battery and terminal 4 wirelessly. When mobile body 100 is not a drone, BMS control device 2 may be disposed in the cloud as the location outside mobile body 100.

<Battery Information Obtaining Unit 21>

Battery information obtaining unit 21 is an example of an obtaining unit, and, for instance, obtains battery information which is information regarding a battery. In the present embodiment, battery information obtaining unit 21 obtains the battery information from the battery included in mobile body 100, and stores the battery information in battery information storage 22. Here, the battery information includes, for example, the temperature, humidity, pressure, current, etc. in the battery unit. The battery information may further include the state of the battery, such as a state of health (SOH) and a state of charge (SOC). The SOH is an index of the degradation degree, that is, the residual value of the battery. The SOH can be calculated as, for example, (remaining capacity when degrading (Ah))/(initial full-charge capacity (Ah))×100. The SOC is an index of the state of charge, that is, the remaining battery capacity. The SOC can be calculated as, for example, (remaining capacity (Ah))/(full-charge capacity (Ah))×100.

Note that in addition to storing the obtained battery information in battery information storage 22, battery information obtaining unit 21 may also output the battery information to server 3 and, using blockchain technology, record the battery information on ledger 301 of storage device 30 connected to server 3.

<Battery Information Storage 22>

Battery information storage 22 is, for example, a storage medium configured as a rewritable, non-nonvolatile memory such as a hard disk drive or a solid-state drive. The battery information is stored in battery information storage 22.

<Battery Residual Value Calculator 23>

Battery residual value calculator 23 is an example of a present residual value calculator, and, for instance, calculates the present residual value of the battery based on the battery information obtained by battery information obtaining unit 21.

In the present embodiment, battery residual value calculator 23 calculates the actual residual value of the battery, that is, the present residual value of the battery, based on the battery information obtained by battery information obtaining unit 21. Note that the present residual value can be calculated based on the SOH indicating the present degradation state of the battery, for example.

<Battery Lifetime Extending Plan Calculator 24>

Battery lifetime extending plan calculator 24 calculates, using a second model which has been trained, a second residual value which is the residual value of the battery in the case where the battery is used in an optimal manner to minimize degradation of the battery. Here, the second model is obtained by teaching the second model the relationship between a state of the battery and a state of degradation that is indicated by the SOH when the battery is used or charged. Here, the state of the battery includes the remaining capacity and the temperature. The second model is used for calculating the second residual value.

In the present embodiment, battery lifetime extending plan calculator 24 trains the second model using the battery information obtained by battery information obtaining unit 21. Battery lifetime extending plan calculator 24 performs this training at a timing different from the timing of calculating the second residual value. More specifically, battery lifetime extending plan calculator 24 teaches the second model, using artificial intelligence (AI) technology, the relationship between the state of the battery, such as the remaining capacity, temperature, and the SOH, and the state of degradation indicated by the SOH when the battery is used (the temperature, humidity, pressure, current, etc in the battery unit). Furthermore, battery lifetime extending plan calculator 24 teaches the second model, using AI technology, the relationship between the state of the battery, such as the remaining life, temperature, and the SOH, and the state of degradation indicated by the SOH when the battery is charged. When training the second model, battery lifetime extending plan calculator 24 gives a higher evaluation value to the battery driving and the battery charging that achieve less degradation in the SOH, thereby teaching the second model an optimal usage according to the state of the battery.

With this, battery lifetime extending plan calculator 24 can calculate, using the second model, a plan indicating the tendency of battery degradation in the case where the battery is used in an optimal manner according to the state of the battery to extend the battery lifetime, that is, minimize the battery degradation (referred to as a battery lifetime extending plan). Using the second model, battery lifetime extending plan calculator 24 can also calculate, as the second residual value, the residual value of the battery in the case where the battery is used in an optimal manner. Note that battery lifetime extending plan calculator 24 can calculate the second residual value using the battery lifetime extending plan calculated.

Known factors for battery degradation include the battery charge/discharge cycle number, the depth of discharge (full charge or over discharge), the magnitude of the discharge current value, the ambient temperature, etc. For example, the battery is known to degrade as the charge/discharge cycle number increases. The battery is also known to degrade when full charged or over discharged. Moreover, the battery is also known to degrade when the discharge current value increases as a result of acceleration etc. of mobile body 100. The battery degrades also when used in a high temperature environment.

<Battery Lifetime Normal Plan Calculator 25>

Battery lifetime normal plan calculator 25 is an example of a first residual value calculator, and, for instance, calculates, using a first model which has been trained, a first residual value which is a residual value of the battery in the case where the user uses the battery with the tendency identical to the tendency of a plurality of other users. Here, the first model is obtained by teaching the first model how degradation of the battery progresses based on a battery usage tendency of the plurality of other users, and is used for calculating the first residual value.

In the present embodiment, battery lifetime normal plan calculator 25 trains the first model using the battery information obtained by battery information obtaining unit 21. Battery lifetime normal plan calculator 25 performs this training at a timing different from the timing of calculating the first residual value. More specifically, battery lifetime normal plan calculator 25 teaches the first model, using AI technology, how degradation of the battery progresses from a given state of the battery such as a given remaining capacity or SOH. Battery lifetime normal plan calculator 25 performs this teaching based on a battery usage tendency of a plurality of users when using the battery as normal.

Note that the battery usage tendency is a usage tendency of a plurality of users, who are unspecified individuals, when using the battery as normal without being conscious of battery degradation or trying to extend the battery lifetime. As such, battery lifetime normal plan calculator 25 teaches the first model how people tend to degrade the battery.

This way, battery lifetime normal plan calculator 25 can calculate, using the first model, a plan indicating the tendency of battery degradation in the case where the battery is used as normal, according to the present state of the battery (referred to as a battery lifetime normal plan). Moreover, battery lifetime normal plan calculator 25 can calculate, as the first residual value, the residual value of the battery in the case where the battery is used as normal according to the battery lifetime normal plan calculated. Note that battery lifetime normal plan calculator 25 may calculate the first residual value using the battery lifetime normal plan calculated.

[Server 3]

Figure 3:
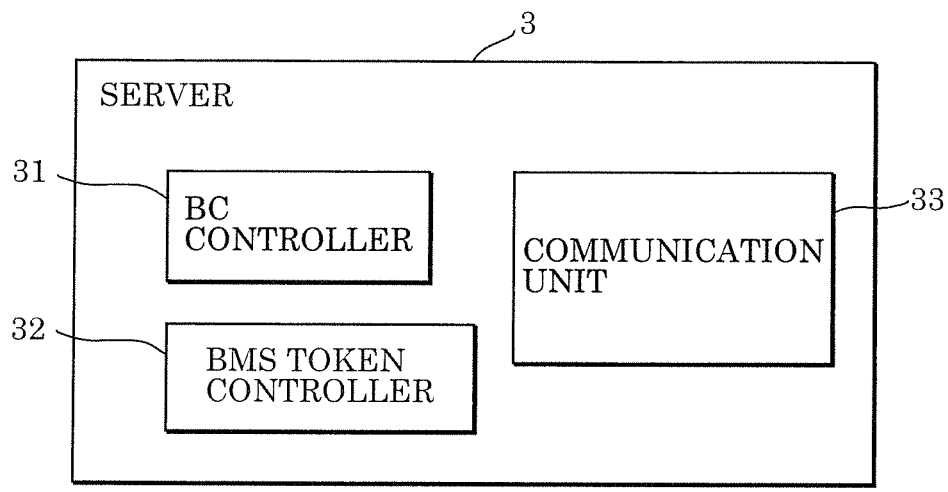
FIG. 3 is a block diagram illustrating an example of a detailed configuration of a server illustrated in FIG. 1.
Figure 4:
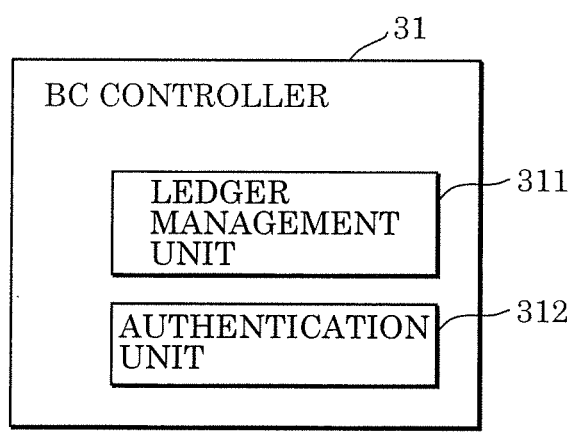
FIG. 4 is a block diagram illustrating an example of a detailed configuration of a BC controller illustrated in FIG. 3.
Figure 5:
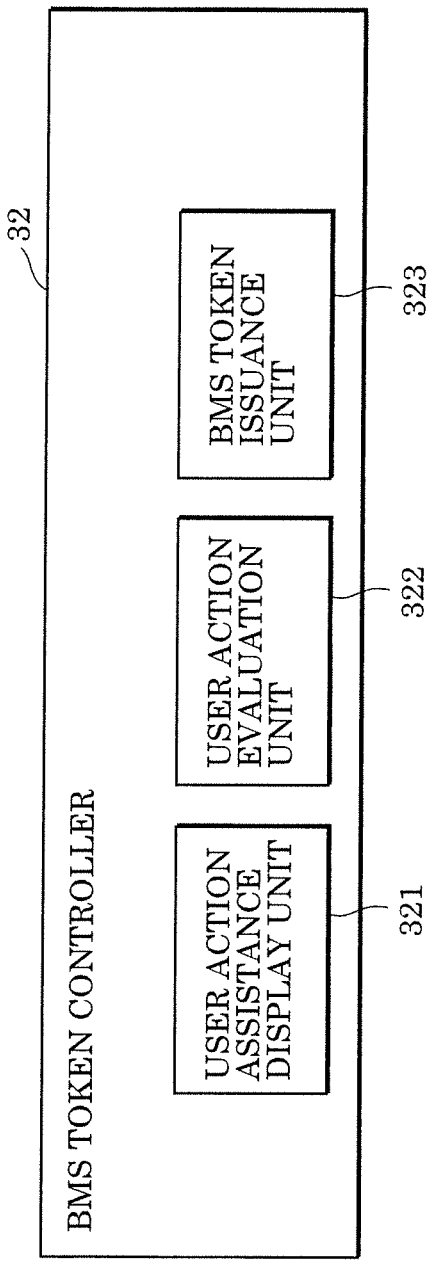
FIG. 5 is a block diagram illustrating an example of a detailed configuration of a BMS token controller illustrated in FIG. 3.

FIG. 3 is a block diagram illustrating an example of a detailed configuration of server 3 illustrated in FIG. 1. FIG. 4 is a block diagram illustrating an example of a detailed configuration of BC controller 31 illustrated in FIG. 3. FIG. 5 is a block diagram illustrating an example of a detailed configuration of BMS token controller 32 illustrated in FIG. 3.

Server 3 is realized by, for example, a computer including a processor and a memory. Server 3 includes BC controller 31, BMS token controller 32, and communication unit 33 as illustrated in FIG. 3, and is connected to storage device 30 illustrated in FIG. 1. Server 3 may be connected to storage device 30 via network 5, or may internally include storage device 30. Storage device 30 includes ledger 301 capable of electric recording.

<BC Controller 31>

BC controller 31 manages ledger 301 included in storage device 30. In the present embodiment, BC controller 31 includes ledger management unit 311 and authentication unit 312 as illustrated in FIG. 4, for example.

Ledger management unit 311 manages ledger 301, and accumulates the residual values calculated by BMS control device 2 by recording the residual values calculated by BMS control device 2 on ledger 301. In the present embodiment, ledger management unit 311 records the present residual value and the first residual value calculated by BMS control device 2 on a blockchain, that is, ledger 301. Ledger management unit 311 may record the second residual value calculated by BMS control device 2 on the blockchain, that is, ledger 301.

Authentication unit 312 at least performs authentication to check whether the user who drives mobile body 100, e.g., requests control on the battery included in mobile body 100, and uses the battery is a valid user. Note that the authentication is performed when, for example, a request to drive mobile body 100 is sent to server 3 via terminal 4 or a mobile terminal used by the user. Terminal 4 may be, for example, a mobile terminal such as a tablet or a smartphone, or an automotive navigation system or the like installed in mobile body 100.

<Communication Unit 33>

Communication unit 33 is realized by a processor and a communication interface (I/F) or the like, and has a function to communicate with BMS control device 2. In the present embodiment, communication unit 33 communicates with BMS control device 2 via, for example, wired or wireless communication.

<BMS Token Controller 32>

BMS token controller 32 issues a token to the user as a reward when the user uses the battery in a manner that suppresses a decrease in the residual value of the battery. Moreover, BMS token controller 32 causes the display of mobile body 100 or the display of terminal 4 to provide an assistance display which encourages the user to take an action that suppresses a decrease in the residual value of the battery. In the present embodiment, BMS token controller 32 includes, as illustrated in FIG. 5, for example, user action assistance display unit 321, user action evaluation unit 322, and BMS token issuance unit 323.

<<User Action Assistance Display Unit 321>>

User action assistance display unit 321 calculates the difference between the second residual value and the present residual value, and, based on the difference, provides the user of the battery with an assistance display which encourages an action related to the usage of the battery. In the present embodiment, user action assistance display unit 321 causes the display of mobile body 100 or terminal 4 to provide an assistance display which encourages the user to use the battery in the optimal manner indicated by the battery lifetime extending plan calculated by the battery lifetime extending plan calculator. For example, user action assistance display unit 321 may provide an assistance display which encourages the user to use the battery in a manner that extends the battery lifetime, by displaying the present residual value of the battery like a fuel consumption display of a gasoline car.

User action assistance display unit 321 may provide an assistance display that suggests an action that makes up the difference between the second residual value and the present residual value, that is, an action that extends the battery lifetime. This way, the user can be encouraged to use the battery in a manner that makes the present residual value higher than the first residual value, that is, in a manner that extends the battery lifetime.

For example, as the assistance display provided to extend the battery lifetime, user action assistance display unit 321 may provide an assistance display indicating an optimal timing for charging. More specifically, user action assistance display unit 321 may derive the remaining capacity of the battery at which the battery should be charged to minimize degradation of the battery, based on the state of degradation of the battery acquired from the battery information obtained. Note that AI technology may be used for deriving the level of remaining capacity at which the battery should be charged to achieve less degradation, given the present state of degradation of the battery acquired from the battery information obtained. User action assistance display unit 321 may provide, as the assistance display which encourages the action, an assistance display indicating a timing at which the battery should be charged, based on the present remaining capacity of the battery acquired from the battery information obtained and the actual usage of the battery by the user. Here, the timing at which the battery should be charged corresponds to the timing at which the remaining capacity of the battery reaches the remaining capacity derived. That is to say, for example, user action assistance display unit 321 may provide an assistance display indicating in how many minutes the battery should be charged, based on the present remaining capacity of the battery and the actual usage of the battery by the user.

For example, as the assistance display provided to extend the battery lifetime, user action assistance display unit 321 may provide a display indicating a negative effect caused by over-current from acceleration or the like. More specifically, user action assistance display unit 321 may derive the amount of current to be generated by the battery to minimize the degradation of the battery, based on the state of degradation of the battery acquired from the battery information obtained. Note that AI technology may be used for deriving the amount of current to be discharged by the battery to achieve less degradation, given the present state of degradation of the battery acquired from the battery information obtained. Then, based on the present amount of current of the battery acquired from the battery information obtained and the actual usage of the battery by the user, user action assistance display unit 321 may provide, as the assistance display which encourages the action, a display indicating the difference between the amount of current derived and the present amount of current. That is to say, for example, user action assistance display unit 321 may provide an assistance display indicating the difference between the amount of current generated by the actual usage of the battery by the user and an optimal amount of current that leads to less degradation. Note that if the mobile body is capable of self-driving, the mobile body may perform self-driving according to the battery lifetime extending plan so as to extend the battery lifetime.

For example, as the assistance display provided to extend the battery lifetime, user action assistance display unit 321 may provide an assistance display that guides the user to a charging station which is optimal in terms of ambient temperature. More specifically, user action assistance display unit 321 may derive a temperature environment in which the battery should be charged to minimize the degradation of the battery, based on the state of degradation of the battery acquired from the battery information obtained. Note that AI technology may be used for deriving the temperature environment in which the battery should be charged to achieve less degradation, given the present state of degradation of the battery acquired from the battery information obtained. User action assistance display unit 321 may provide, as the assistance display which encourages the action, a display indicating, on a map, a spot at which the battery is chargeable in the temperature environment derived. That is to say, for example, user action assistance display unit 321 may provide an assistance display by, for example, displaying, on a map, the location of a charging station at which the battery can be charged in an optimal temperature environment.

Note that the assistance display provided by user action assistance display unit 321 is not limited to the examples given above. With AI technology, the assistance display can be provided in various levels to encourage actions related to the battery usage. The assistance display in a first level may be provided by, for example, simply displaying, on the display of mobile body 100 or terminal 4, the degree of pressure to be put on the accelerator pedal of mobile body 100 based on the remaining capacity of the battery. The assistance display in a second level may be provided by, for example, displaying, on the display of mobile body 100 or terminal 4, a message that encourages the user not to press down on the accelerator pedal more than a certain degree even on an uphill road in order to reduce the load on the battery, based on the SOH of the battery and the condition of the road on which mobile body 100 is traveling. The assistance display in a third level may be provided by, for example, displaying, on the display of mobile body 100 or terminal 4, a guidance that encourages the user to take a flat route in order to reduce the load on the battery, based on the SOH of the battery, the condition of the road on which mobile body 100 is traveling, and the traveling route.

<<User Action Evaluation Unit 322>>

User action evaluation unit 322 is an example of an evaluation unit, and, for instance, calculates an evaluation value based on the present residual value of the battery calculated based on the battery information and the first residual value calculated using the first model which has been trained. Here, as described earlier, the first residual value is the residual value of the battery in the case where the user uses the battery with the tendency identical to the tendency of a plurality of other users.

Figure 6:
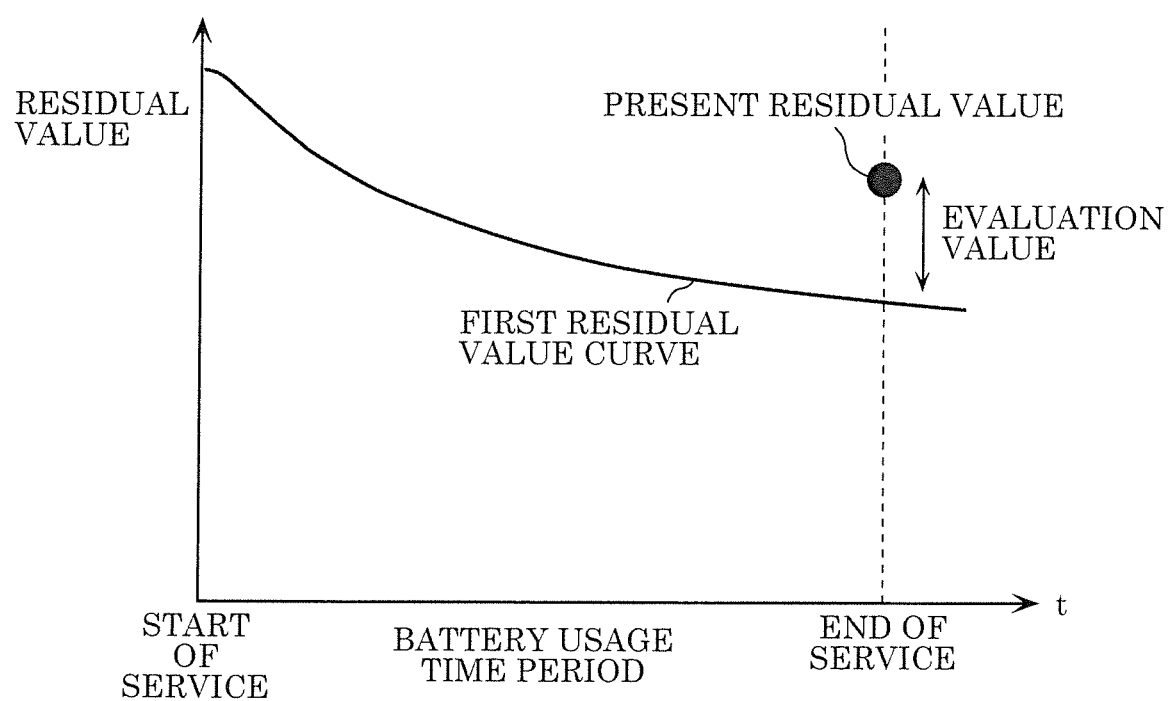
FIG. 6 is a graph illustrating an example of a method for calculating an evaluation value calculated by a user action evaluation unit according to the embodiment.

FIG. 6 is a graph illustrating an example of a method for calculating the evaluation value calculated by user action evaluation unit 322 according to the present embodiment.

A first residual value curve illustrated in FIG. 6 shows the first residual value from the start of the service to the end of the service, and can be created using the first residual values calculated by battery lifetime normal plan calculator 25. Here, the start of the service means the time at which the user starts using the battery included in mobile body 100, e.g., the time at which the user starts driving mobile body 100. The end of the service means the time at which the user finishes using the battery included in mobile body 100.

In the present embodiment, user action evaluation unit 322 obtains, from BMS control device 2, the present residual value of the battery and the first residual value at the end of the service, and calculates the evaluation value based on the present residual value of the battery and the first residual value obtained. In the example illustrated in FIG. 6, user action evaluation unit 322 calculates, as the evaluation value, the difference between the present residual value and the first residual value. In such a manner, user action evaluation unit 322 compares the present residual value of the battery at the end of the service with the first residual value at the end of the service, and determines the difference, that is, an improvement value (a numerical value indicating that the battery lifetime has been extended), as the evaluation value.

Figure 7:
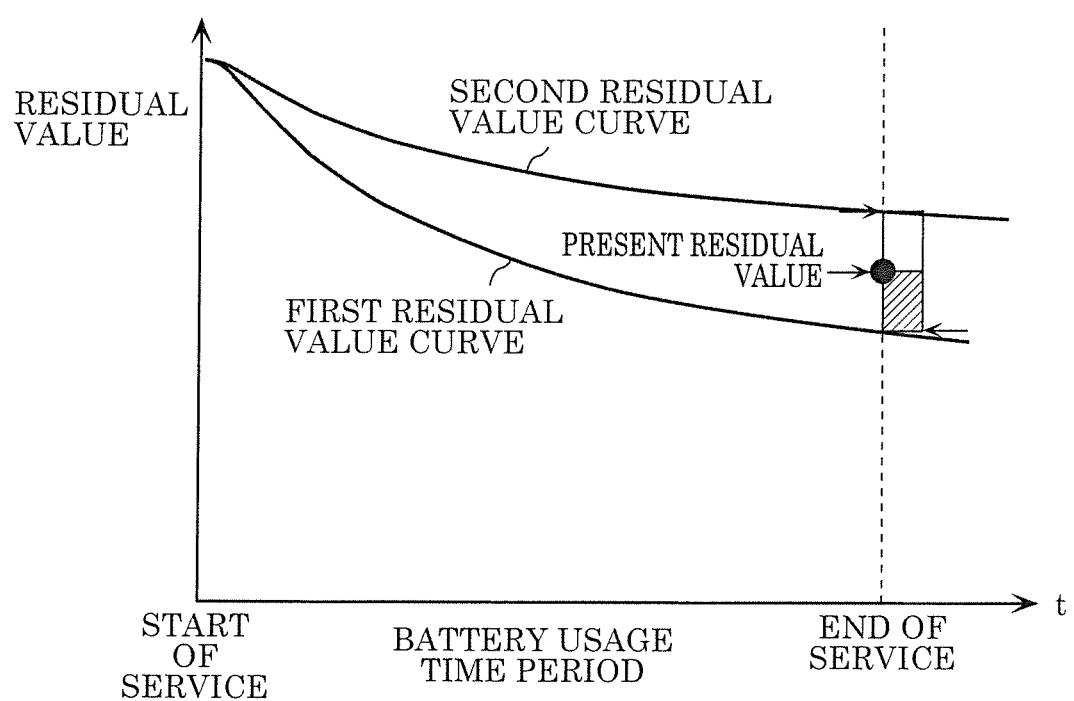
FIG. 7 is a graph illustrating another example of the method for calculating the evaluation value calculated by the user action evaluation unit according to the embodiment.

FIG. 7 is a graph illustrating another example of the method for calculating the evaluation value calculated by user action evaluation unit 322 according to the present embodiment.

A first residual value curve and a second residual value curve illustrated in FIG. 7 respectively show the first residual value and the second residual value from the start of the service to the end of the service. The first residual value curve illustrated in FIG. 7 can be created using the first residual values calculated by battery lifetime normal plan calculator 25, and the second residual value curve illustrated in FIG. 7 can be created using the second residual values calculated by battery lifetime extending plan calculator 24.

User action evaluation unit 322 obtains, from BMS control device 2, the present residual value of the battery, the first residual value, and the second residual value at the end of the service, and calculates the evaluation value based on the present residual value of the battery, the first residual value, and the second residual value obtained. In the example illustrated in FIG. 7, user action evaluation unit 322 calculates, as the evaluation value, a proportion of a first difference between the present residual value and the first residual value to a second difference between the first residual value and the second residual value at the end of the service, given that the second difference is 100. In the manner as described, user action evaluation unit 322 may calculate, as the evaluation value, the proportion of the first difference between the present residual value and the first residual value to the second difference between the second residual value calculated using the battery lifetime extending plan and the first residual value calculated using the battery lifetime normal plan.

Figures 8, 9:
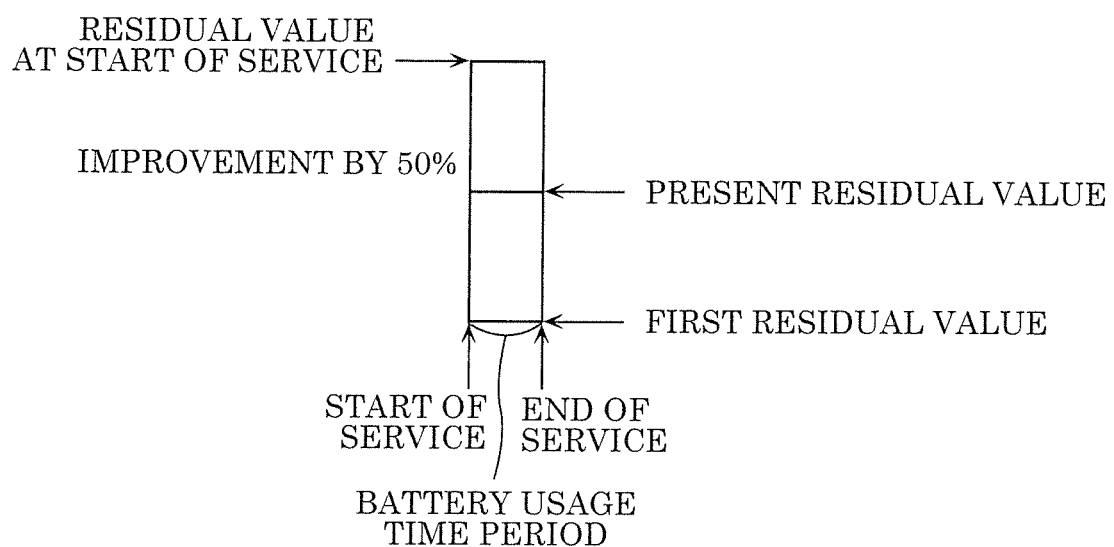
FIG. 8 is an explanatory diagram illustrating another example of the method for calculating the evaluation value calculated by the user action evaluation unit according to the embodiment.
FIG. 9 illustrates points corresponding to improvement ratios used in the evaluation value calculation method illustrated in FIG. 8.

FIG. 8 is an explanatory diagram illustrating another example of the method for calculating the evaluation value calculated by user action evaluation unit 322 according to the present embodiment. FIG. 9 illustrates points corresponding to improvement ratios used in the evaluation value calculation method illustrated in FIG. 8.

User action evaluation unit 322 obtains, from BMS control device 2, the present residual values of the battery at the start and the end of the service, and the first residual value at the end of the service. User action evaluation unit 322 then calculates the evaluation value based on the obtained present residual values of the battery at the start and the end of the service and the obtained first residual value at the end of the service.

For example, user action evaluation unit 322 may calculate the evaluation value by multiplying the improvement ratio of the present residual value in a battery usage time period by the battery usage time period. User action evaluation unit 322 may also calculate the evaluation value by multiplying, by the battery usage time period, the points corresponding to the improvement ratio of the present residual value in the battery usage time period. FIG. 8 illustrates an example in which the improvement ratio of the present residual value in the battery usage time period is 50%. In the example illustrated in FIG. 9, the improvement ratio of 50% corresponds to 5 points.

As described above, user action evaluation unit 322 may calculate the evaluation value by multiplying the value of the ratio of the present residual value with respect to the first residual value by the usage time period. Here, the usage time period is a time period from when the user starts using the battery to when the user finishes using the battery, and the present residual value is a residual value reduced as a result of a lapse of the usage time period. In more detail, user action evaluation unit 322 may calculate the evaluation value by multiplying a value of a point corresponding to a ratio by the usage time period. Here, the ratio is a proportion of a first difference between the first residual value and the present residual value that is calculated by BMS token controller 32 and is the residual value at the time when the user finishes using the battery to a second difference between the first residual value and the residual value that is calculated by BMS token controller 32 and is the residual value at the time when the user starts using the battery, given that the second difference is 100%.

<<BMS Token Issuance Unit 323>>

BMS token issuance unit 323 is an example of a token issuance unit, and, for instance, issues a token to the user according to the evaluation value calculated by user action evaluation unit 322. In other words, BMS token issuance unit 323 issues a token to the user according to the evaluation value calculated based on the present residual value calculated and the first residual value. The token is issued using micropayment technology.

In the present embodiment, BMS token issuance unit 323 issues a token as a reward based on the evaluation value calculated by user action evaluation unit 322.

Note that BMS token issuance unit 323 may issue a token as reward based on accumulated evaluation values calculated by user action evaluation unit 322. BMS token issuance unit 323 may additionally charge a fee when the evaluation value calculated by user action evaluation unit 322 at the end of the service is negative. BMS token issuance unit 323 may, in the first place, charge a battery usage fee allowing for a negative evaluation value, and pay a kickback by reflecting the negative evaluation value on the token at the end of the service.

Moreover, BMS token issuance unit 323 may issue an additional token when the present residual value at the end of the service is higher than the second residual value indicated by the battery lifetime extending plan. In other words, when the present residual value calculated exceeds the second residual value, BMS token issuance unit 323 may issue, to the user, an additional token other than the token issued according to the evaluation value calculated based on the present residual value and the first residual value. This is because the present residual value higher than the second residual value can be evaluated as valuable data which can be used to improve the battery lifetime extending plan. It is also because, in the case where the second model is trained again using the present residual value higher than the second residual value, it is possible to contribute to an improvement in the performance of AI technology, that is, the second model.

Note that the token as a reward may be automatically issued according to a description of a smart contract registered in the blockchain, rather than being issued via escrow.

[Terminal 4]

Figure 10:
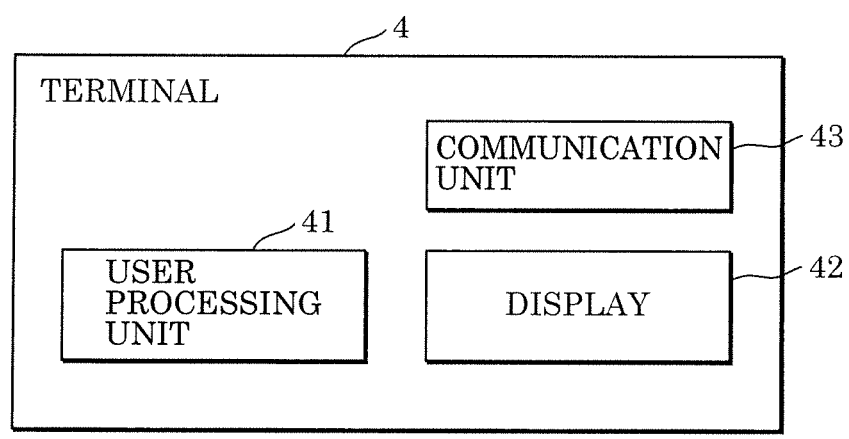
FIG. 10 is a block diagram illustrating an example of a detailed configuration of a terminal illustrated in FIG. 1.

FIG. 10 is a block diagram illustrating an example of a detailed configuration of terminal 4 illustrated in FIG. 1.

Terminal 4 is realized by, for example, a computer including a processor and a memory, and is included in mobile body 100 as illustrated in FIG. 1. As described earlier, terminal 4 may be, for example, an automotive navigation system, or may be a tablet or a smartphone of the user. In the present embodiment, terminal 4 includes user processing unit 41, display 42, and communication unit 43 as illustrated in FIG. 10.

<User Processing Unit 41>

User processing unit 41 is used for identifying the user who is driving mobile body 100 and is using the battery included in mobile body 100. Specifically, user processing unit 41 receives an operation input by the user who is using the battery included in mobile body 100, and performs user authentication in relation to server 3. When user processing unit 41 receives the operation input by the user who is using the battery included in mobile body 100, user processing unit 41 may further perform user authentication in relation to BMS control device 2. This way, the user who is driving mobile body 100 and using the battery included in mobile body 100 can be identified.

<Display 42>

Display 42 may present the assistance display provided by user action assistance display unit 321 when the user authentication in relation to server 3 is performed by user processing unit 41. Display 42 may present information related to the token issued by BMS token issuance unit 323 when the user authentication in relation to server 3 is performed by user processing unit 41. For example, display 42 may present a message indicating that the token has been issued by BMS token issuance unit 323, or may present the value or the amount of the token issued by BMS token issuance unit 323.

<Communication Unit 43>

Communication unit 43 is realized by a processor and a communication interface (I/F) or the like, and has a function to communicate with BMS control device 2. In the present embodiment, communication unit 43 communicates with BMS control device 2 and server 3 via, for example, wired or wireless communication.

[Operations etc. of System 1]

Hereinafter, operations of system 1 having the above configuration will be described.

Figure 11:
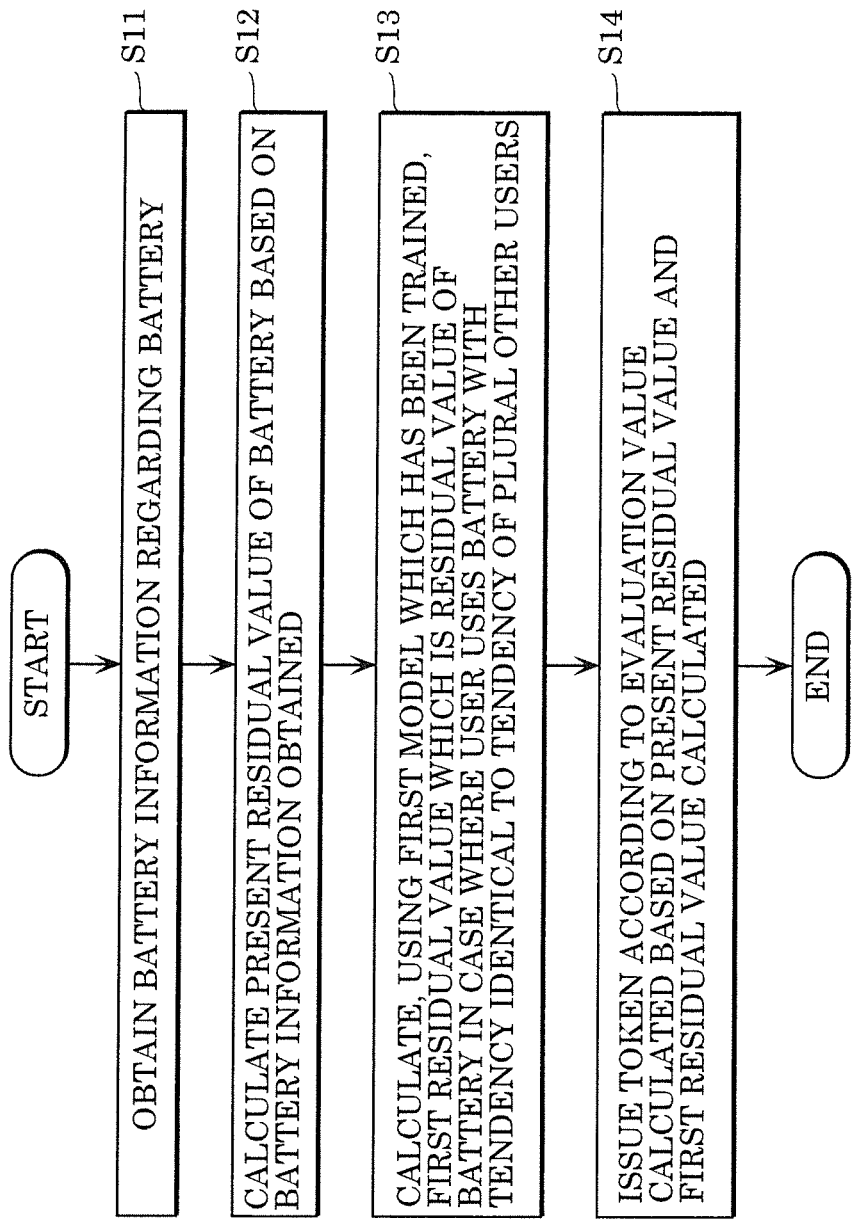
FIG. 11 is a flow chart illustrating an example of operations of the system according to the embodiment.

FIG. 11 is a flow chart illustrating an example of operations of system 1 according to the present embodiment. The following description assumes that it is after the end of the service; for example, after the user has driven mobile body 100, in other words, after the user has finished using the battery included in mobile body 100.

First, BMS control device 2 obtains battery information regarding a battery (S11).

Next, BMS control device 2 calculates the present residual value of the battery based on the battery information obtained in Step S11 (S12).

Next, BMS control device 2 calculates, using the first model which has been trained, the first residual value which is the residual value of the battery in the case where the user uses the battery with the tendency identical to the tendency of a plurality of other users (S13). In the present embodiment, BMS control device 2 calculates, using the trained first model, the first residual value which is the residual value of the battery in the case where the battery is used as normal according to the battery lifetime normal plan. As described earlier, the battery lifetime normal plan indicates the tendency of battery degradation in the case where the battery is used as normal.

Next, server 3 issues a token according to an evaluation value calculated based on the present residual value calculated in Step S12 and the first residual value calculated in Step S13 (S14). In the present embodiment, server 3 calculates, as the evaluation value, the difference between, for example, the present residual value and the first residual value based on the present residual value calculated in Step S12 and the first residual value calculated in Step S13. Server 3 then issues a token to the user according to the evaluation value calculated.

Figure 12:
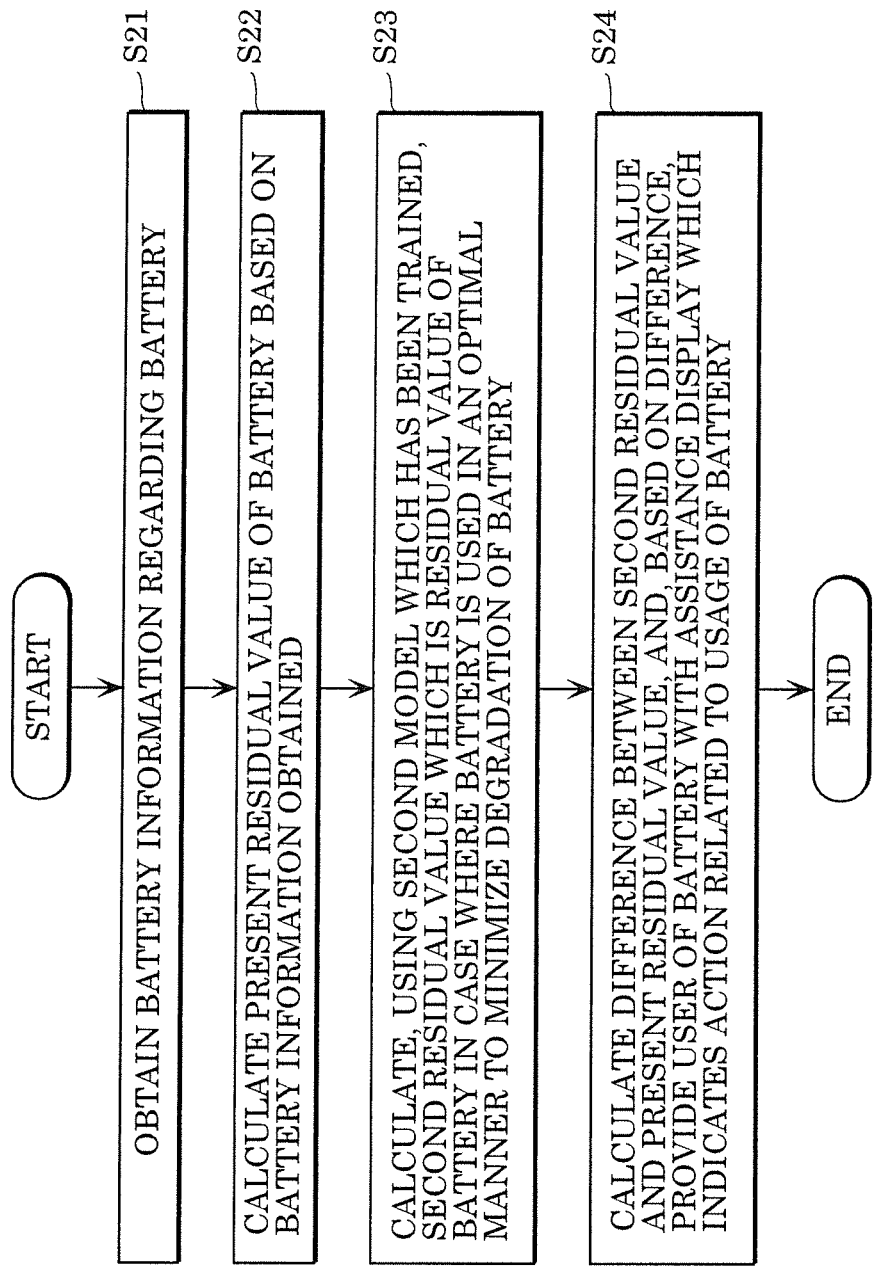
FIG. 12 is a flow chart illustrating another example of operations of the system according to the embodiment.

FIG. 12 is a flow chart illustrating another example of operations of system 1 according to the present embodiment. The following description assumes that it is after the start of the service and before the end of the service; for example, when the user is driving mobile body 100, in other words, when the user is using the battery included in mobile body 100.

First, BMS control device 2 obtains battery information regarding a battery (S21), and calculates the present residual value of the battery based on the battery information obtained (S22). Note that Steps S21 and S22 are the same processing as Steps S11 and S12 described above.

Next, BMS control device 2 calculates, using the second model which has been trained, the second residual value which is the residual value of the battery in the case where the battery is used in an optimal manner to minimize degradation of the battery (S23). In the present embodiment, BMS control device 2 calculates, using the trained second model, the second residual value which is the residual value of the battery in the case where the battery is used in an optimal manner according to the battery lifetime extending plan. As described earlier, the battery lifetime extending plan indicates the tendency of battery degradation in the case where the battery is used in an optimal manner according to the state of the battery in order to extend the battery lifetime.

Next, server 3 calculates the difference between the second residual value calculated in Step S23 and the present residual value calculated in Step S22, and, based on the difference calculated, provides the user of the battery with an assistance display indicating an action related to the usage of the battery (S24). For example, server 3 provides a display which encourages an action of using the battery in an optimal manner to extend the battery lifetime.

Figure 13:
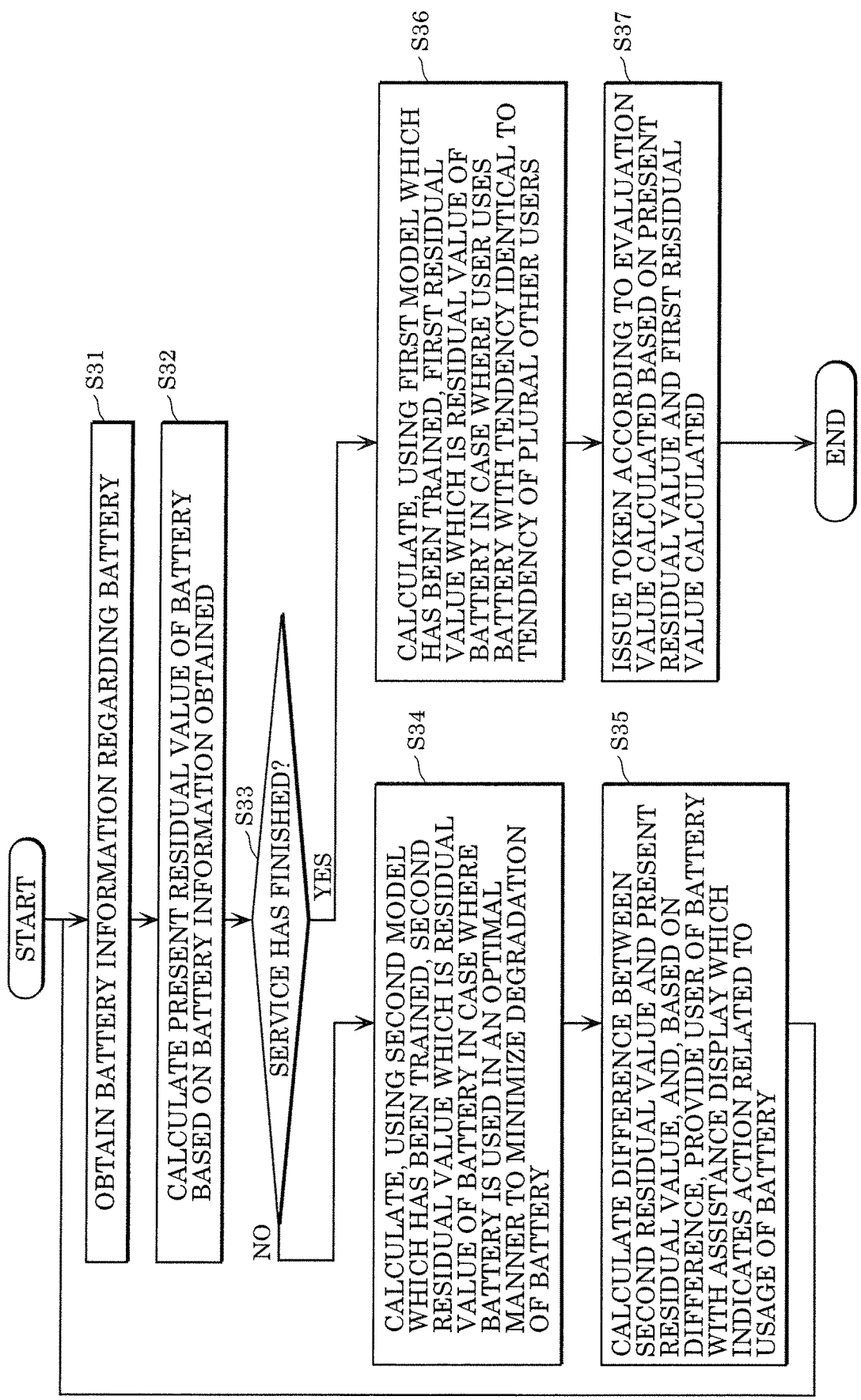
FIG. 13 is a flow chart illustrating yet another example of operations of the system according to the embodiment.

Although the steps illustrated in FIG. 11 and the steps illustrated in FIG. 12 have been described as separate operations performed by system 1, the present disclosure is not limited to this example. As illustrated in FIG. 13, system 1 may perform the operations illustrated in FIG. 11 and FIG. 12 in combination.

Figure 14:
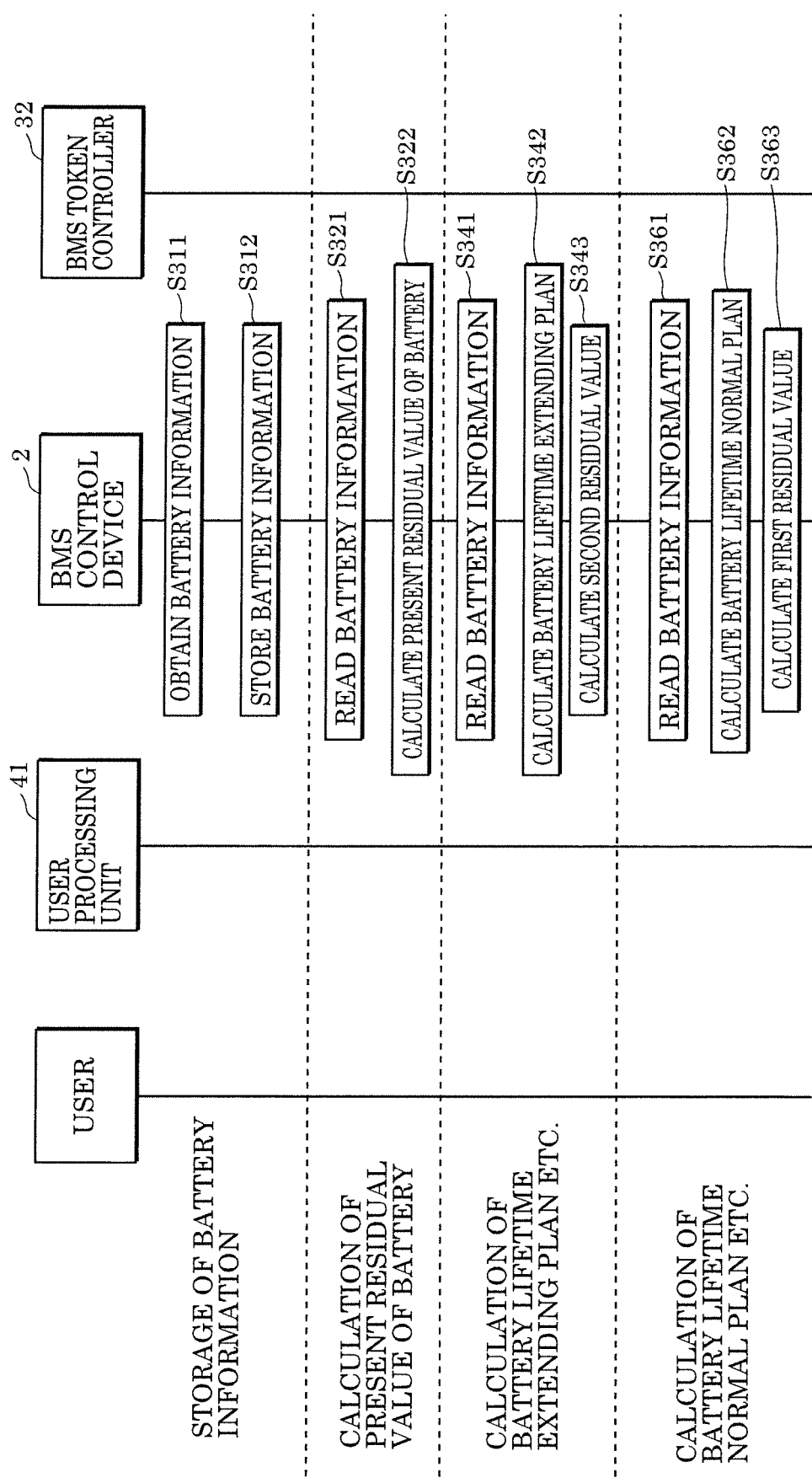
FIG. 14 illustrates an example of the details of the processing illustrated in FIG. 13.
Figure 15:
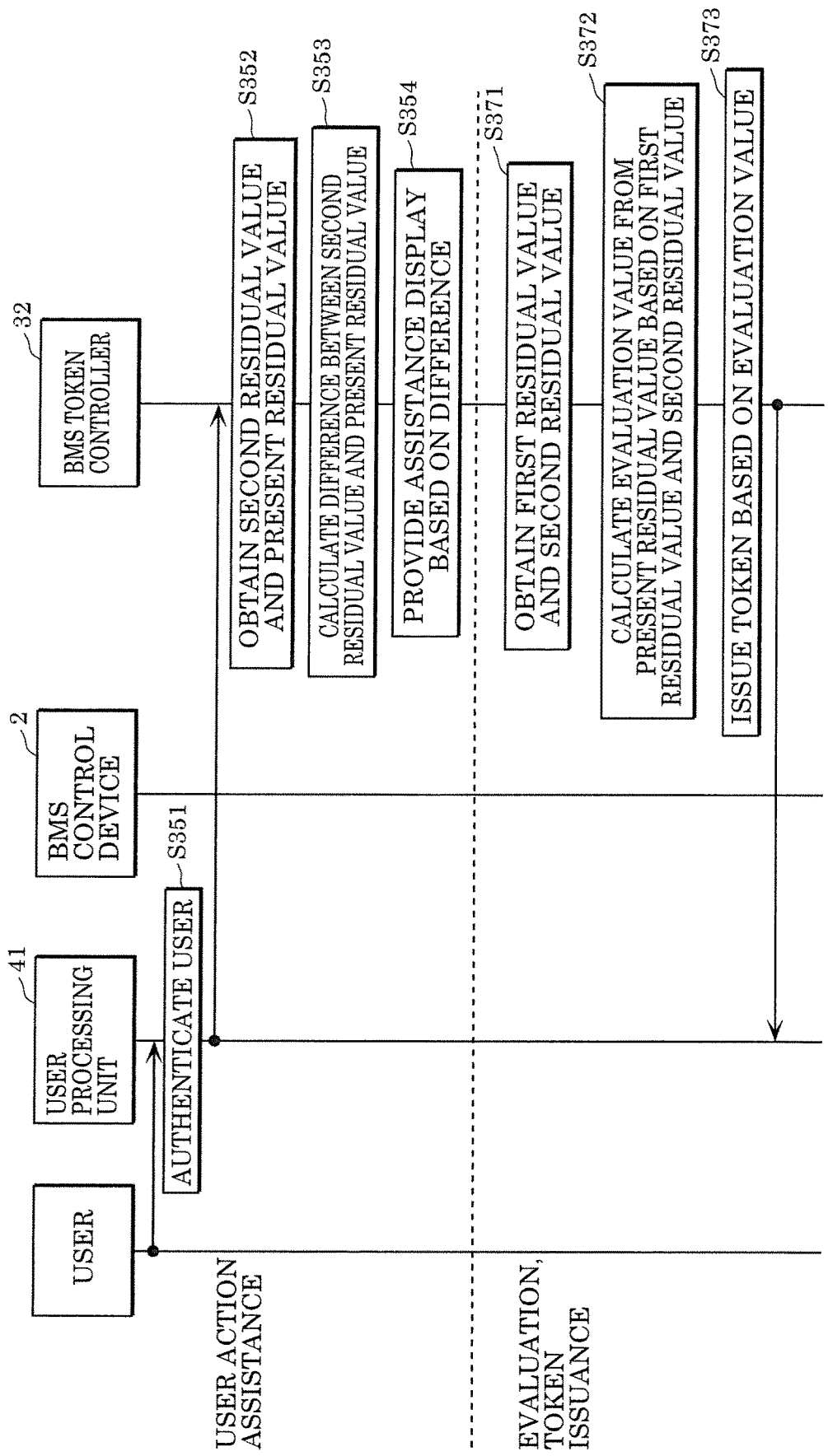
FIG. 15 illustrates an example of the details of the processing illustrated in FIG. 13.

FIG. 13 is a flow chart illustrating yet another example of operations of system 1 according to the present embodiment. FIG. 14 and FIG. 15 illustrate an example of the details of the processing illustrated in FIG. 13.

Steps S31 and S32 illustrated in FIG. 13 are the same processing as Steps S11 and S12 or Steps S21 and S22 described above. In more detail, in Step S31 as illustrated in FIG. 14, for example, BMS control device 2 obtains battery information regarding a battery (S311) and stores the battery information obtained (S312). In Step S32, as illustrated in FIG. 14, for example, BMS control device 2 reads the battery information (S321), and calculates the present residual value of the battery based on the battery information read out (S322).

In Step S33 illustrated in FIG. 13, BMS control device 2 determines whether or not the service has finished. If the service has not finished (NO in S33), BMS control device 2 proceeds to the processing in Step S34. If the service has finished (YES in S33), BMS control device 2 proceeds to the processing in Step S36.

Steps S34 and S35 illustrated in FIG. 13 are the same processing as Steps S23 and S24 described above. In more detail, in Step S34, as illustrated in FIG. 14, for example, BMS control device 2 reads the battery information (S341), and, using the second model which has been trained, calculates the battery lifetime extending plan based on the battery information read out (S342). Next, using the trained second model, BMS control device 2 calculates the second residual value based on the battery information read out (S343). Note that BMS control device 2 may calculate the second residual value using the battery lifetime extending plan calculated.

In Step S35, as illustrated in FIG. 15, for example, first, the user who uses the battery included in mobile body 100 causes user processing unit 41 of terminal 4 to perform user authentication in relation to BMS token controller 32 of server 3 (S351). Next, BMS token controller 32 obtains the second residual value and the present residual value calculated by BMS control device 2 (S352), and calculates the difference between the second residual value and the present residual value obtained (S353). Next, based on the difference calculated in Step S353, BMS token controller 32 provides the user with an assistance display indicating an action related to the usage of the battery (S354).

Steps S36 and S37 illustrated in FIG. 13 are the same processing as Steps S13 and S14 described above. In more detail, in Step S36, as illustrated in FIG. 14, for example, BMS control device 2 reads the battery information (S361), and, using the first model which has been trained, calculates the battery lifetime normal plan based on the battery information read out (S362). Next, using the trained first model, BMS control device 2 calculates the first residual value based on the battery information read out (S363). Note that BMS control device 2 may calculate the first residual value using the battery lifetime normal plan calculated.

In Step S37, as illustrated in FIG. 15, for example, BMS token controller 32 of server 3 obtains the first residual value and the second residual value calculated by BMS control device 2 (S371). Next, BMS token controller 32, for example, calculates the evaluation value from the present residual value based on the first residual value and the second residual value obtained in Step S371 (S372). Next, BMS token controller 32 issues a token to the user as a reward based on the evaluation value calculated in Step S372 (S373).

[Advantageous Effects etc.]

As described above, with the control method and the related technologies according to the present embodiment, a token is issued when the calculated evaluation value is positive, e.g., when the present residual value resulted from the usage of the battery by the user is higher than the first residual value that is the residual value in the case where the battery is used as normal. That is to say, it is possible to cause the user to use the battery in a manner that further suppresses a decrease in the battery residual value.

For example, with batteries possessed by individuals such as batteries in vehicles possessed by individuals, the individual who possesses the battery receives a benefit in return for his or her action taken to increase the residual value of the battery. Thus, with batteries possessed by individuals, it is possible to encourage the user to use the battery in a manner that further suppresses a decrease in the battery residual value. On the other hand, with shared batteries, since the user receives no benefit in return, there are cases where the user is not encouraged to use the battery in a manner that suppresses a decrease in the residual value of the battery. However, with the control method and the related technologies according to the present embodiment, a token can be issued as a reward, thus making it possible to cause the user to use the battery in a manner that suppresses a decrease in the residual value of the battery. That is to say, with shared batteries as well as the batteries possessed by individuals, the battery can have an extended lifetime, and thus can be efficiently used in, for example, recycling, thereby leading to energy conservation.

With the control method and the related technologies according to the present embodiment, the first residual value can be precisely calculated using the first model which has been trained by machine learning or the like.

With the control method and the related technologies according to the present embodiment, since the present residual value and the first residual value are recorded on the blockchain, it is possible to ensure the authenticity and anti-tampering of the present residual value and the first residual value. As a result, a token can be issued with reduction in erroneous calculation of the evaluation value. Even if a problem occurs in the token issuance, the correct cause of the problem can be identified.

With the control method and the related technologies according to the present embodiment, a token is issued using micropayment technology, thus making micropayments possible. Accordingly, a token can be effectively issued to the user who uses the battery in a manner that further suppresses a decrease in the battery residual value.

With the control method and the related technologies according to the present embodiment, it is possible to provide an assistance display to encourage use of the battery in a manner that extends the battery lifetime, and it is therefore possible to cause the user to use the battery in a manner that further suppresses a decrease in the battery residual value. In addition, since this allows the battery to have an extended lifetime, the battery is efficiently used in, for example, recycling, thus leading to energy conservation.

Possibilities of Other Embodiments

Although system 1, the control method, and the related technologies according to the present disclosure have been described in the above embodiment, the present disclosure is not limited to the above embodiment. For example, embodiments achieved by any combination of the structural elements described in this Specification and embodiments achieved by excluding some of the structural elements may be considered as the embodiments of the present disclosure. Furthermore, variations achieved through various modifications to the above embodiment that can be conceived by a person of ordinary skill in the art without departing from the essence of the present disclosure, that is, the meaning of the recitations in the claims, are also included in the present disclosure.

The present disclosure also encompasses such cases as below.

(1) Each of the devices described above is, specifically, a computer system including a microprocessor, a read-only memory (ROM), a random-access memory (RAM), a hard disk unit, a display unit, a keyboard, a mouse, etc. A computer program is stored in the RAM or the hard disk unit. Each device achieves its function as a result of the microprocessor operating according to the computer program. Here, the computer program is configured by combining a plurality of instruction codes indicating instructions for the computer in order to achieve a given function.

(2) A portion or all of the structural elements of each of the devices described above may be configured from one system large-scale integration (LSI). A system LSI is a super-multifunction LSI manufactured with a plurality of components integrated on a single chip, and is specifically a computer system including a microprocessor, ROM, and RAM, for example. A computer program is stored in the RAM. The system LSI achieves its function as a result of the microprocessor operating according to the computer program.

(3) A portion or all of the structural elements of each of the devices described above may each be configured as an integrated circuit (IC) card that is detachably attached to each device, or as a stand-alone module. The IC card and the module are computer systems configured from a microprocessor, ROM, and RAM, for example. The IC card and the module may also include the super-multifunction LSI described above. The IC card and the module achieve their functions as a result of the microprocessor operating according to a computer program. The IC card and the module may be tamperproof.

(4) The present disclosure may be realized as the methods described above. The present disclosure may be a computer program realizing these methods using a computer, or a digital signal including the computer program.

(5) Furthermore, the present disclosure may also be realized as the computer program or the digital signal recorded on a computer-readable recording medium such as a flexible disk, hard disk, a CD-ROM, a magneto-optical (MO) disc, a digital versatile disc (DVD), DVD-ROM, DVD-RAM, a Blu-ray disc (BD), or a semiconductor memory. The present disclosure may also be realized as the digital signal recorded on these recording media.

Moreover, the present disclosure may also be realized by transmitting the computer program or the digital signal via, for example, an electric communication line, a wireless or wired communication line, a network such as the Internet, or data broadcasting.

Moreover, the present disclosure may be realized as a computer system including memory having the computer program recorded thereon and a microprocessor that operates according to the computer program.

Moreover, the computer program or the digital signal may be realized by an independent computer system by being recorded on the recording medium and transmitted, or by being transmitted via the network, for example.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a control method, a server, an in-vehicle device, and a recording medium capable of encouraging use of a battery, including a shared battery, in a manner that extends the battery lifetime.

What is claimed is:

1. A control method, comprising:
   (a) obtaining battery information which is information regarding a battery;
   (b) calculating a present residual value of the battery based on the battery information obtained;
   (c) calculating a first residual value using a first model which has been trained, the first residual value being a residual value of the battery in a case where a user uses the battery with a tendency identical to a tendency of a plurality of other users; and
   (d) issuing a token to the user according to an evaluation value calculated based on the present residual value and the first residual value calculated,
   wherein the present residual value and the first residual value are recorded on a blockchain.

2. The control method according to claim 1, wherein the first model is obtained by teaching the first model how degradation of the battery progresses based on a battery usage tendency of the plurality of other users, and is used for calculating the first residual value.

3. The control method according to claim 1, wherein the token is issued using micropayment technology.

4. The control method according to claim 1, wherein the evaluation value is a difference between the present residual value and the first residual value.

5. The control method according to claim 1, wherein the evaluation value is calculated by multiplying a value of a ratio of the present residual value with respect to the first residual value by a usage time period which is a time period from when the user starts using the battery to when the user finishes using the battery, the present residual value being a residual value reduced as a result of a lapse of the usage time period.

6. The control method according to claim 5, wherein
the evaluation value is calculated by multiplying a value of a point corresponding to a ratio by the usage time period, the ratio being a proportion of a first difference between the first residual value and the present residual value that is calculated in (b) and is a residual value at a time when the user finishes using the battery to a second difference between the first residual value and the residual value that is calculated in (b) and is a residual value at a time when the user starts using the battery, given that the second difference is 100%.

7. The control method according to claim 1, further comprising:
(e) calculating a second residual value using a second model which has been trained, the second residual value being a residual value of the battery in a case where the battery is used in an optimal manner to minimize degradation of the battery; and
(f) calculating a difference between the second residual value and the present residual value, and, based on the difference, providing the user of the battery with an assistance display which encourages an action related to usage of the battery.

8. The control method according to claim 7, wherein
the second model is obtained by teaching the second model a relationship between a state of the battery and a state of degradation that is indicated by a state of health (SOH) when the battery is used or charged, and the second model is used for calculating the second residual value, the state of the battery including a remaining capacity and a temperature.

9. The control method according to claim 7, wherein in (f):
a remaining capacity of the battery at which the battery should be charged to minimize the degradation of the battery is derived based on a state of degradation of the battery acquired from the battery information obtained; and
as the assistance display which encourages the action, an assistance display which indicates a timing at which the battery should be charged is provided based on a present remaining capacity of the battery acquired from the battery information obtained and actual usage of the battery by the user, the timing at which the battery should be charged corresponding to a timing at which the remaining capacity of the battery reaches the remaining capacity derived.

10. The control method according to claim 7, wherein in (f):
an amount of current to be generated by the battery to minimize the degradation of the battery is derived based on a state of degradation of the battery acquired from the battery information obtained; and
as the assistance display which encourages the action, a display indicating a difference between the amount of current derived and a present amount of current of the battery acquired from the battery information obtained is provided based on the present amount of current of the battery and actual usage of the battery by the user.

11. The control method according to claim 7, wherein in (f):
a temperature environment in which the battery should be charged to minimize the degradation of the battery is derived based on a state of degradation of the battery acquired from the battery information obtained; and as the assistance display which encourages the action, a display indicating, on a map, a spot at which the battery is chargeable in the temperature environment derived is provided.

12. The control method according to claim 7, wherein
(d) further includes
issuing an additional token other than the token to the user when the present residual value calculated exceeds the second residual value.

13. A control method, comprising:
obtaining battery information which is information regarding a battery;
calculating a present residual value of the battery based on the battery information obtained;
calculating, using a model which has been trained, a residual value of the battery in a case where the battery is used in an optimal manner to minimize degradation of the battery; and
calculating a difference between the residual value and the present residual value, and, based on the difference, providing a user of the battery with an assistance display which encourages an action related to usage of the battery,
wherein the present residual value and the residual value are recorded on a blockchain.

14. A server, comprising:
an evaluation unit configured to calculate an evaluation value based on a present residual value of a battery calculated based on battery information regarding the battery and a first residual value calculated using a first model which has been trained, the first residual value being a residual value of the battery in a case where a user uses the battery with a tendency identical to a tendency of a plurality of other users; and
a token issuance unit configured to issue a token to the user according to the evaluation value calculated by the evaluation unit,
wherein the present residual value and the first residual value are recorded on a blockchain.

15. An in-vehicle device, comprising:
an obtaining unit configured to obtain battery information which is information regarding a battery;
a present residual value calculator which calculates a present residual value of the battery based on the battery information obtained by the obtaining unit; and
a first residual value calculator which calculates a first residual value using a first model which has been trained, the first residual value being a residual value of the battery in a case where a user uses the battery with a tendency identical to a tendency of a plurality of other users, wherein
a token is issued to the user according to an evaluation value calculated based on the present residual value and the first residual value calculated,
wherein the present residual value and the first residual value are recorded on a blockchain.

16. A non-transitory computer-readable recording medium for use in a computer, the recording medium having a computer program recorded thereon for causing the computer to execute:
(a) obtaining battery information which is information regarding a battery;
(b) calculating a present residual value of the battery based on the battery information obtained;
(c) calculating a first residual value using a first model which has been trained, the first residual value being a residual value of the battery in a case where a user uses the battery with a tendency identical to a tendency of a plurality of other users; and (d) issuing a token to the user according to an evaluation value calculated based on the present residual value and the first residual value calculated, wherein the present residual value and the first residual value are recorded on a blockchain.

\* \* \* \* \*